(12) United States Patent
Xiao et al.

(10) Patent No.: US 12,547,063 B2
(45) Date of Patent: Feb. 10, 2026

(54) PROJECTION SCREEN AND PROJECTION SYSTEM (71) Applicant: HISENSE LASER DISPLAY CO., LTD, Shandong (CN)

(72) Inventors: Wei Xiao, Shandong (CN); Chao Wang, Shandong (CN); Rui Hou, Shandong (CN); Yu Feng, Shandong (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 154 days.

(21) Appl. No.: 18/351,275

(22) Filed: Jul. 12, 2023

(65) Prior Publication Data
US 2023/0359114 A1 Nov. 9, 2023

Related U.S. Application Data (63) Continuation of application No. PCT/CN2022/082297, filed on Mar. 22, 2022.

(30) Foreign Application Priority Data

May 24, 2021 (CN) .......................... 202110566602.3

(51) Int. Cl.
*G03B 21/602* (2014.01)
*G03B 21/58* (2014.01)

(52) U.S. Cl.
CPC ........... *G03B 21/602* (2013.01); *G03B 21/58* (2013.01)

(58) Field of Classification Search
CPC ...... G03B 21/602; G03B 21/58; G03B 21/60; G02B 5/0205; G02B 5/0236; G02B 5/0242

(Continued)

(56) References Cited

U.S. PATENT DOCUMENTS

2001/0033913 A1 10/2001 Murata et al.
2004/0240054 A1 12/2004 Aiura et al.
(Continued)

FOREIGN PATENT DOCUMENTS

CN 105408777 A 3/2016
CN 110412825 A 11/2019
(Continued)

OTHER PUBLICATIONS

International Search Report and Written Opinion dated May 27, 2022 in corresponding International Application No. PCT/CN2022/082297, translated, 16 pages.

(Continued)

*Primary Examiner* — Christopher E Mahoney
(74) *Attorney, Agent, or Firm* — MH2 TECHNOLOGY LAW GROUP LLP (57) ABSTRACT

A projection screen and a projection system are provided. The projection screen includes a surface layer, at least one substrate layer, a Fresnel lens layer, a reflective layer, and a plurality of light-transmitting protrusions. The surface layer, the substrate layer, the Fresnel lens layer, and the reflective layer are sequentially arranged in a stack manner. The plurality of light-transmitting protrusions are disposed on a surface of the surface layer away from the Fresnel lens layer. At least one light-transmitting protrusion of the plurality of light-transmitting protrusions includes: a body portion and at least one of a gradually narrowing portion or a gradually expanding portion. The gradually narrowing portion or the gradually expanding portion is disposed on a surface of the body portion away from the Fresnel lens layer.

19 Claims, 8 Drawing Sheets

(58) Field of Classification Search
USPC .......................................................... 359/455
See application file for complete search history.

(56) References Cited

U.S. PATENT DOCUMENTS

| | | | |
|---|---|---|---|
| 2005/0275952 | A1 | 12/2005 | Odagiri et al. |
| 2007/0153379 | A1* | 7/2007 | Mikkelsen ............. G03B 21/58 |
| | | | 359/461 |
| 2015/0362832 | A1* | 12/2015 | Chuang ................ G03B 21/602 |
| | | | 359/455 |
| 2017/0184953 | A1* | 6/2017 | Su ........................ G02B 5/0231 |

FOREIGN PATENT DOCUMENTS

| | | |
|---|---|---|
| CN | 110850674 A | 2/2020 |
| CN | 110908235 A | 3/2020 |
| CN | 210894983 U | 6/2020 |
| CN | 112513685 A | 3/2021 |
| CN | 212905890 U | 4/2021 |
| CN | 113238449 A | 8/2021 |
| CN | 214670066 U | 11/2021 |
| EP | 3550360 A1 * 10/2019 ........... G02B 3/0056 |
| JP | S61296342 A | 12/1986 |
| JP | 2002311507 A | 10/2002 |
| JP | 2008065297 A | 3/2008 |
| WO | WO-2015122055 A1 * 8/2015 ........... G02B 5/0231 |
| WO | WO-2018116931 A1 * 6/2018 ............. B32B 27/08 |

OTHER PUBLICATIONS

Chinese First Office Action dated Mar. 4, 2022 in corresponding Chinese Application No. 202110566602.3, translated, 15 pages.
Chinese Notification to Grant Patent Right for Invention dated Aug. 2, 2022 in corresponding Chinese Application No. 202110566602.3, translated, 6 pages.

* cited by examiner

PROJECTION SCREEN AND PROJECTION SYSTEM

CROSS-REFERENCE TO RELATED APPLICATIONS

This application is a continuation application of International Patent Application No. PCT/CN2022/082297, filed on Mar. 22, 2022, which claims priority to Chinese Patent Application No, 202110566602.3, filed on May 24, 2021, which is incorporated herein by reference in its entirety.

TECHNICAL FIELD

The present disclosure relates to the field of projection display technologies, and in particular, to a projection screen and a projection system.

BACKGROUND OF THE INVENTION

In the field of projection display, especially in the field of ultra-short-focus laser projection display, in order to achieve good brightness and display effect, a projector is generally used with a projection screen having Fresnel microstructure. The projection screen having Fresnel microstructure generally includes a surface layer, a substrate layer, a Fresnel lens layer, and a reflective layer that are sequentially stacked.

SUMMARY

In an aspect, a projection screen is provided. The projection screen includes a surface layer, at least one substrate layer, a Fresnel lens layer, a reflective layer, and a plurality of light-transmitting protrusions. The surface layer, the substrate layer, the Fresnel lens layer, and the reflective layer are sequentially arranged in a stack manner. The plurality of light-transmitting protrusions are disposed on a surface of the surface layer away from the Fresnel lens layer. At least one light-transmitting protrusion of the plurality of light-transmitting protrusions includes: a body portion and at least one of a gradually narrowing portion or a gradually expanding portion. The gradually narrowing portion or the gradually expanding portion is disposed on a surface of the body portion away from the Fresnel lens layer.

In another aspect, a projection system is provided. The projection system includes a projector and the projection screen.

BRIEF DESCRIPTION OF THE DRAWINGS

In order to illustrate technical solutions of the embodiments of the present disclosure more clearly, accompanying drawings to be used in the description of some embodiments will be introduced briefly below. However, the accompanying drawings to be described below are merely accompanying drawings of some embodiments of the present disclosure, and a person having ordinary skill in the art may obtain other drawings according to these drawings. In addition, the accompanying drawings to be described below may be regarded as schematic diagrams and are not limitations on an actual size of a product, an actual process of a method, and an actual timing of a signal to which the embodiments of the present disclosure relate.

DESCRIPTION OF THE EMBODIMENTS

Some embodiments of the present disclosure will be described clearly and completely with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are only used for descriptive purposes and cannot be construed as indicating or implying the relative importance or implicitly indicating the number of indicated technical features. Therefore, the features defined with "first" and "second" may explicitly or implicitly include one or more of these features. In the description of the embodiments of the present disclosure, "a plurality of" or "the plurality of" means two or more unless otherwise specified.

In the description of some embodiments, the terms "coupled" and "connected" and their derivatives may be used. The term "connected" should be understood in a broad sense; for example, "connected" may represent a fixed connection, a detachable connection, or connected as an integral body; "connected" may be directly "connected" or indirectly "connected" through an intermediate means. The term "coupled" may be used in the description of some embodiments to indicate that two or more components are in direct physical or electrical contact with each other. However, the term "coupled" or "communicatively coupled" may also mean that two or more elements are not in direct contact with each other, but still cooperate or interact with each other. The embodiments disclosed herein are not necessarily limited to the content herein.

The phrase "at least one of A, B, and C" has the same meaning as the phrase at least one of A, B, or C", and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of the phase "applicable to" or "configured to" herein means an open and inclusive expression, which does not exclude devices that are applicable to or configured to perform additional tasks or steps.

The term such as "about," "substantially," or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

As used herein, "parallel," "perpendicular," and "equal" include the stated conditions and the conditions similar to the stated conditions, and the range of the similar conditions is within the acceptable deviation range, where the acceptable deviation range is determined by a person of ordinary skill in the art in consideration of the measurement in question and the error associated with the measurement of a specific quantity (i.e., the limitation of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

The present disclosure provides a projection system, which is used for an audience to project and play pictures or videos.

Figure 1:
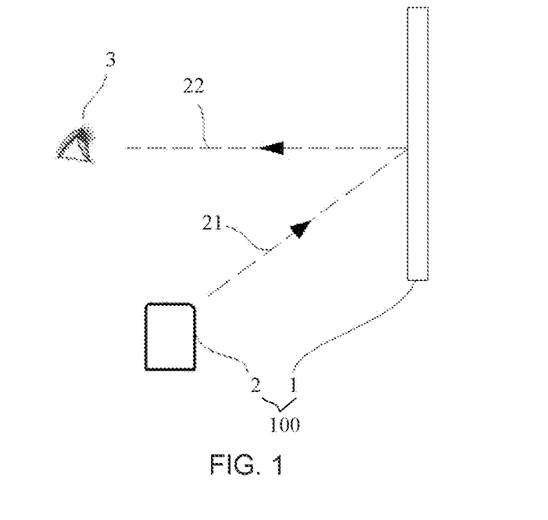
FIG. 1 is a schematic diagram showing an operating state of a projection system, in accordance with some embodiments.

FIG. 1 is a schematic diagram showing an operating state of a projection system, in accordance with some embodiments. Referring to FIG. 1, a projection system 100 includes a projection screen 1 and a projector 2. To facilitate description of the projection system 100, some embodiments of the present disclosure are mainly described by considering an example in which the projection screen 1 is in an unfolded state in a vertical plane, and a direction in which the audience 3 faces the projection screen 1 is defined as a front view direction. Referring to FIG. 1, when the projection system 100 is in use, the projector 2 may be placed at the front and bottom of the projection screen 1, and the audience 3 is located in front of the projection screen 1 and faces the projection screen 1. Incident light 21 emitted by the projector 2 is incident on the projection screen 1 and then are reflected by the projection screen 1 to finally form outgoing light 22 to be incident on eyes of the audience 3 and form a screen image on the projection screen 1.

In general, a projection screen with a Fresnel microstructure includes a surface layer, a substrate layer, a Fresnel lens layer, and a reflective layer that are sequentially stacked. When the incident light emitted by the projector is irradiated on a surface of the surface layer away from the Fresnel lens layer, the incident light may have a specular reflection on the surface, and usually about 1% to 5% of the incident light is reflected by the surface to a ceiling. As a result, a bright and clear image (being defined as a ceiling reflection image) is formed on the ceiling, which has an impact on visual experience of the screen image.

To this end, some embodiments of the present disclosure provide a projection screen 1, which may avoid forming the ceiling reflection image. The projection screen 1 according to some embodiments of the present disclosure will be described in detail below.

Figure 2:
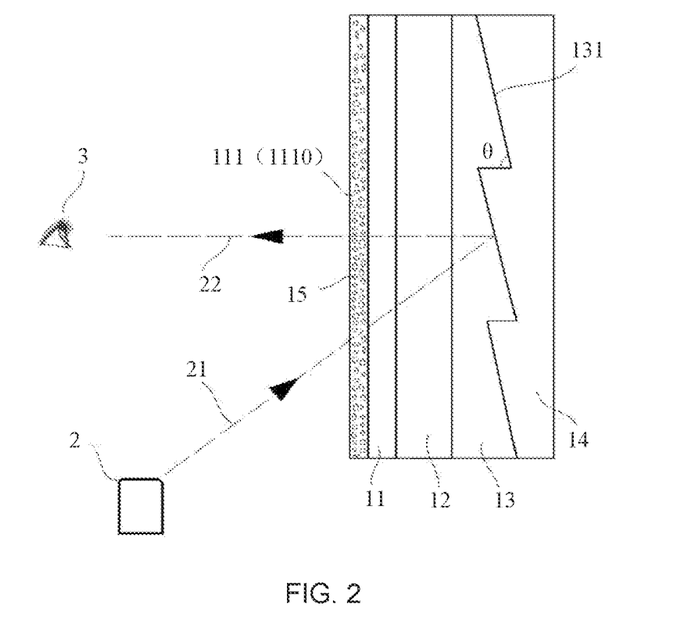
FIG. 2 is a schematic diagram showing an operating state of a projection screen, in accordance with some embodiments.
Figure 3:
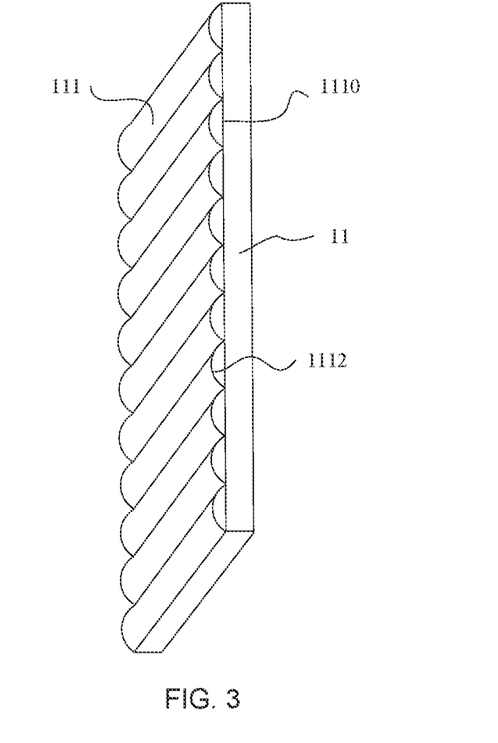
FIG. 3 is a structural diagram of a surface layer and a plurality of light-transmitting protrusions in FIG. 2.
Figure 7:
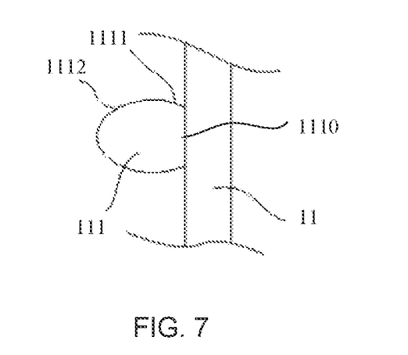
FIG. 7 is a partial structural diagram of a surface layer and a plurality of light-transmitting protrusions in yet another projection screen, in accordance with some embodiments.

FIG. 2 is a schematic diagram showing an operating state of a projection screen 1, the light path shown by the dotted arrow is only for illustration, and the refraction of light is ignored. FIG. 3 is a structural diagram of the surface layer and a plurality of light-transmitting protrusions in FIG. 2. Referring to FIGS. 2 and 3, the projection screen 1 includes a surface layer 11, at least one substrate layer 12, a Fresnel lens layer 13, a reflective layer 14, and a plurality of light-transmitting protrusions 111. The surface layer 11, the substrate layer 12, the Fresnel lens layer 13, and the reflective layer 14 are sequentially stacked. The plurality of light-transmitting protrusions 111 are disposed on a surface of the surface layer 11 away from the Fresnel lens layer 13. Referring to FIG. 2 and FIG. 7, at least one light-transmitting protrusion of the plurality of light-transmitting protrusions 111 includes a body portion 1110, and at least one of a gradually narrowing portion 1112 or a gradually expanding portion. The gradually narrowing portion 1112 or the gradually expanding portion is disposed on a surface of the body portion 1110 away from the Fresnel lens layer 13.

Referring to FIG. 2, when the projection screen 1 is in use in some embodiments of the present disclosure, the incident light 21 emitted by the projector 2 is incident on the projection screen 1, and after entering the projection screen 1, the incident light 21 is then reflected by the reflective layer 14 at a reflective surface 131 of the Fresnel lens layer 13, and finally exits the projection screen 1 and forms outgoing light 22 incident to the eyes of the audience 3.

The plurality of light-transmitting protrusions 111 are disposed on the surface of the surface layer 11 away from the Fresnel lens layer 13. At least one of the gradually narrowing portion 1112 or the gradually expanding portion is disposed on the surface of the body portion 1110 away from the Fresnel lens layer 13. This is equivalent to setting the surface of the surface layer 11 away from the Fresnel lens layer 13 as an uneven surface. Thus, when the incident light 21 is irradiated on the surface layer 11, the incident light reflected by the surface layer 11 will be reflected in all directions, thus avoiding the formation of a clear image on the ceiling to a certain extent, thereby avoiding the occurrence of the ceiling reflection image and improving the visual experience of the screen image.

A haze value of a surface of the at least one light-transmitting protrusion 111 is any value within a range of 12% to 20% inclusive. For example, the haze value of the surface of the at least one light-transmitting protrusion 111 may be 12%, 15%, 18%, or 20%. In a case where the haze value of the surface of the at least one light-transmitting protrusion 111 is any value within a range of 12% to 20% inclusive, the incident light is not prone to specular reflection in a case where the incident light irradiates on the surface of the at least one light-transmitting 111, thereby avoiding the occurrence of the ceiling reflection image.

Setting the haze value of the surface of a light-transmitting protrusion 111 to a range of 12% to 20% may be achieved through at least two following methods: firstly, conducting anti-glare treatment on the surface of the light-transmitting protrusion 111; secondly, performing mold texture treatment on the surface of the light-transmitting protrusion 111.

The at least one light-transmitting protrusion 111 includes a first diffusion particle 15 disposed in the body portion 1110. The first diffusion particle 15 is disposed inside the at least one light-transmitting protrusion. Thus, after the incident light 21 emitted by the projector 2 enters the at least one light-transmitting protrusion 111, the incident light 21 is diffused by the first diffusion particle 15 and propagate to the Fresnel lens layer 13, so that the diffusivity of light irradiating on the Fresnel lens layer 13 is good, and the diffusion range of light is wide when emitted from the projection screen 1, thereby expanding the viewing angle of the projection screen 1. It will be noted that the at least one light-transmitting protrusion 111 includes one or more first diffusion particles 15.

In some embodiments, the material of the first diffusion particle 15 may be polymethyl methacrylate (PMMA).

In some embodiments, the material of the surface layer 11 may be ultraviolet curing glue, also known as UV glue.

The manufacturing method of the surface layer 11 provided with the plurality of light-transmitting protrusions 111 includes: first coating the UV glue on the surface of the substrate layer 12 away from the Fresnel lens layer 13, and then stamping by a mold whose shape and size matching with the plurality of light-transmitting protrusions 111, then curing the UV glue through a UV light source, and finally demoulding.

Of course, in some embodiments, the surface layer 11 provided with the plurality of light-transmitting protrusions 111 may also be made by heating and curing a thermosetting glue on the substrate layer 12.

Figure 11:
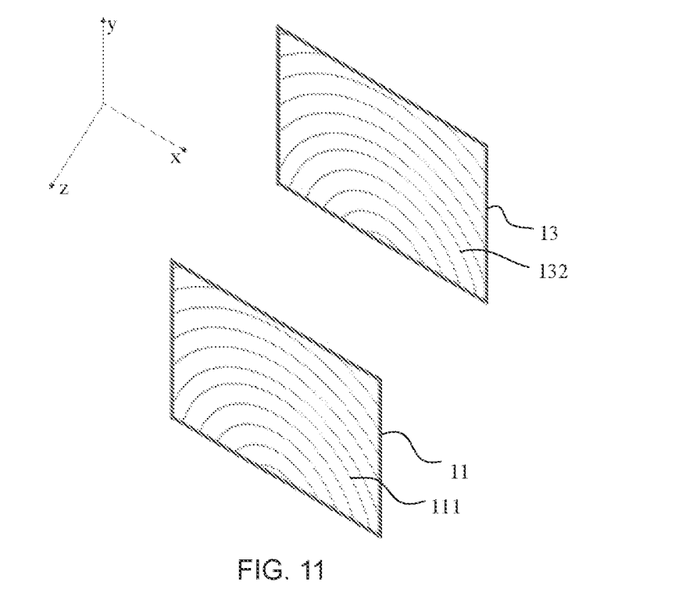
FIG. 11 is a diagram showing a positional relationship of a surface layer, a plurality of light-transmitting protrusions and a Fresnel lens layer in a projection screen, in accordance with some embodiments.

FIG. 11 is a diagram showing a positional relationship of a surface layer, a plurality of light-transmitting protrusions, and a Fresnel lens layer in a projection screen, in accordance with some embodiments. In FIG. 11, the y-axis is the vertical direction, the x-axis is the horizontal direction, and the z-axis is a thickness direction of the projection screen. Referring to FIG. 11, at least one of the plurality of light-transmitting protrusions 111 is in a shape of a strip, and a length direction of a light-transmitting protrusion 111 is parallel to the Fresnel lens layer 13.

It will be noted that the parallel to the Fresnel lens layer 13 means parallel to an extending direction of an annular texture 132 on the surface of the Fresnel lens layer 13. A pitch (e.g., distance) between two adjacent light-transmitting protrusions of the plurality of light-transmitting protrusions 111 is greater than or equal to a pitch (e.g., distance) of two adjacent annular textures 132. For example, in a case where the pitch of the two adjacent annular textures 132 of the Fresnel lens layer 13 is 100 μm, the pitch between the two adjacent light-transmitting protrusions 111 may be 120 μm. Thus, for the projection screen 1 with same size, the number of light-transmitting protrusions 111 required to avoid ceiling reflection image is smaller; so that difficulty of design and processing of the mold for making the surface layer 11 provided with the plurality of light-transmitting protrusions 111 may be reduced, thereby reducing the manufacturing difficulty and cost of the projection screen 1.

Figure 12:
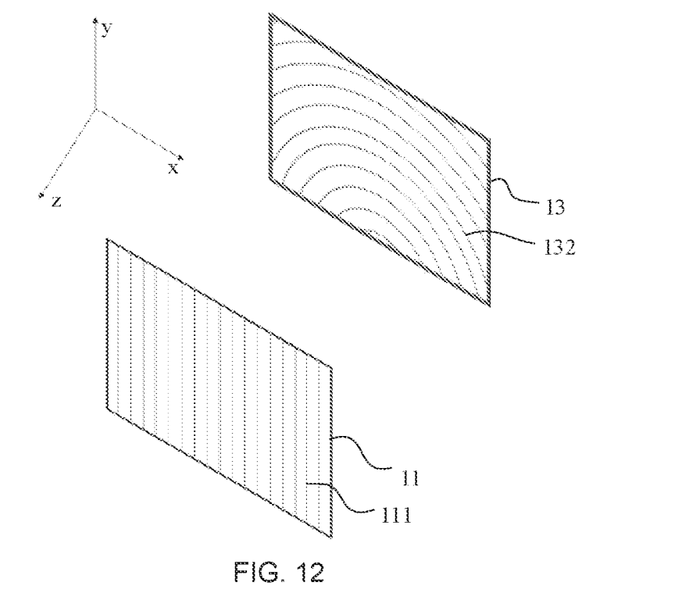
FIG. 12 is a diagram showing a positional relationship of a surface layer, a plurality of light-transmitting protrusions and a Fresnel lens layer in another projection screen, in accordance with some embodiments.

FIG. 12 is a diagram showing a positional relationship of a surface layer, a plurality of light-transmitting protrusions, and a Fresnel lens layer in another projection screen, in accordance with some embodiments. Referring to FIG. 12, the plurality of light-transmitting protrusions 111 each have a linear shape and are arranged in parallel. Therefore, it is conducive to reducing the complexity of the mold and reducing the difficulty of manufacturing the mold.

In some embodiments, in the length direction of the at least one light-transmitting protrusion 111, a shape and a size of section of a light-transmitting protrusion 111 are same. Thus, the shape of the mold is relatively regular, thereby further reducing the difficulty of designing and processing the mold and reducing the difficulty and cost of manufacturing the projection screen 1.

For example, referring to FIGS. 2 and 3, the light-transmitting protrusion 111 is a linear semi-cylindrical structure, that is, using a plane perpendicular to the length direction of the light-transmitting protrusion 111 as a reference plane, an orthogonal projection of the light-transmitting protrusion 111 on the reference plane is in a shape of a semicircle. Arc surfaces of the light-transmitting protrusions 111 each are away from the Fresnel lens layer 13, and the planes opposite to the arc surfaces of the light-transmitting protrusions 111 each are proximate to the Fresnel lens layer 13; thus, profiles of semicircular sections of the light-transmitting protrusions 111 narrow down in a direction away from the Fresnel lens layer 13, so as to form the gradually narrowing portions 1112.

The length directions of the plurality of light-transmitting protrusions 111 shown in FIG. 2 are along the vertical direction, and the plurality of light-transmitting protrusions 111 are arranged in parallel and continuously along a horizontal direction. The horizontal direction described in the present disclosure is a direction perpendicular to both the front view direction and the vertical direction. The light-transmitting protrusions 111 are arranged continuously, that is, any adjacent two light-transmitting protrusions 111 are sequentially connected.

Figure 4:
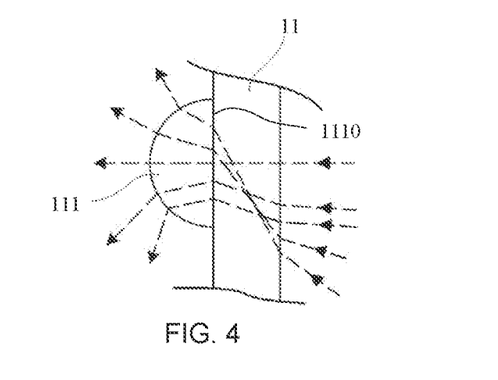
FIG. 4 is a schematic diagram of a path of incident light entering the air after passing through a surface layer and a plurality of light-transmitting protrusions, in accordance with some embodiments.

FIG. 4 is a schematic diagram of the path of incident light 21 entering the air after passing through the surface layer 11 and the light-transmitting protrusions 111. The incident light 21 passes through the surface layer 11 and the light-transmitting protrusions 111 and then enter the air during the outgoing process, thereby being refracted. Due to that refractive indexes of the surface layer 11 and the light-transmitting protrusion 111 are greater than a refractive index of the air, the incident light 21 will be diffused. In addition, due to that the light-transmitting protrusion 111 has the gradually narrowing portion 1112 and the length direction of the light-transmitting protrusion 111 is along the vertical direction, the outgoing light tends to diffuse along the horizontal direction. In this way, by providing the light-transmitting protrusions 111, it is conducive to increasing the viewing angle of the projection screen 1 in the horizontal direction.

In some embodiments, the length direction of the light-transmitting protrusion 111 may also be other directions, after passing through the light-transmitting protrusions 111, the incident light 21 may diffuse along another set direction in the process of exiting. The set direction is perpendicular to both the front view direction and the length direction of each light-transmitting protrusion 111. In this way, it is possible to increase the viewing angle of the projection screen 1 in the set direction.

It will be noted that, the light-transmitting protrusion 111 is a semi-cylindrical structure, and the shape of the light-transmitting protrusion 111 is not necessarily limited to half of a certain cylindrical structure. In some cases, the area of the orthogonal projection of the light-transmitting protrusion 111 may also be larger or smaller than the area of a corresponding semi-circle. Here, the corresponding semi-circle refers to a semi-circle with the same curvature as the light-transmitting protrusion 111.

Figure 13:
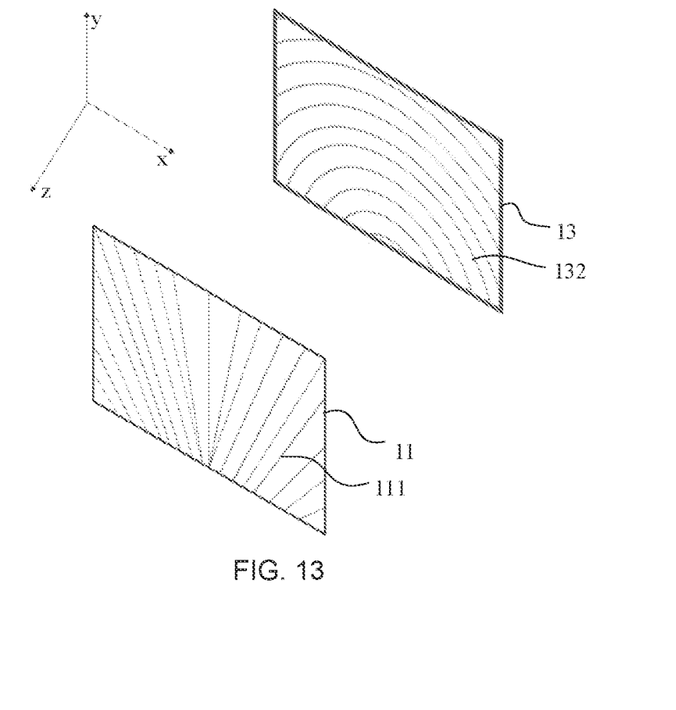
FIG. 13 is a diagram showing a positional relationship of a surface layer, a plurality of light-transmitting protrusions and a Fresnel lens layer in yet another projection screen, in accordance with some embodiments.
Figure 14:
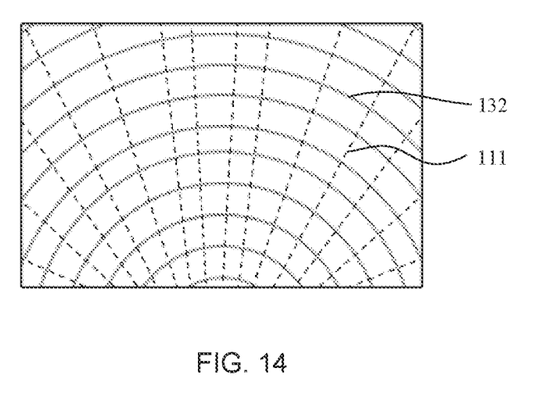
FIG. 14 is a diagram showing a positional relationship of the plurality of light-transmitting protrusions and annular textures on a surface of the Fresnel lens layer in FIG. 13.

The above is mainly described by considering an example in which each light-transmitting protrusion 111 is in the shape of the strip, and the length direction of the light-transmitting protrusion 111 is parallel to the Fresnel lens layer 13. However, the present disclosure is not limited thereto. In some embodiments, the light-transmitting protrusion 111 may also be of other shapes. For example, referring to FIG. 13 and FIG. 14, the light-transmitting protrusion 111 is a columnar structure. A length direction of the columnar structure is perpendicular to an extending direction of the annular textures 132 on the surface of the Fresnel lens layer 13. There is an arc surface at the end of the columnar structure away from the Fresnel lens layer 13. And the arc surface narrows or expands in the front view direction. Moreover, the arc surface is a strip-shaped arc surface. Thus, the emitted light may also be diffused, which is conducive to increasing the viewing angle of the projection screen 1.

Figure 5:
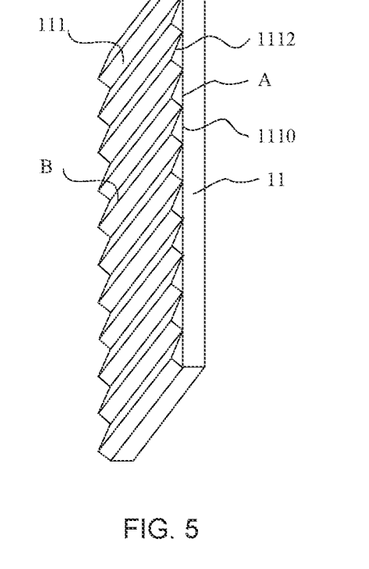
FIG. 5 is a structural diagram of a surface layer and a plurality of light-transmitting protrusions in another projection screen, in accordance with some embodiments.

FIG. 5 is a structural diagram of a surface layer and a plurality of light-transmitting protrusions in another projection screen, in accordance with some embodiments. The main difference between FIG. 5 and FIG. 3 is in the shape of the light-transmitting protrusion 111. Referring to FIG. 5, an orthogonal projection on the reference plane is in a shape of a triangle, that is, the corresponding light-transmitting protrusion 111 is a triangular prism structure. A surface A of the light-transmitting protrusion 111 faces the Fresnel lens layer 13, and an edge B opposite to the surface A is away from the Fresnel lens layer 13, so that the light-transmitting protrusion 111 as a whole narrows in the direction away from the Fresnel lens layer 13, so as to form the gradually narrowing portion 1112.

Figure 6:
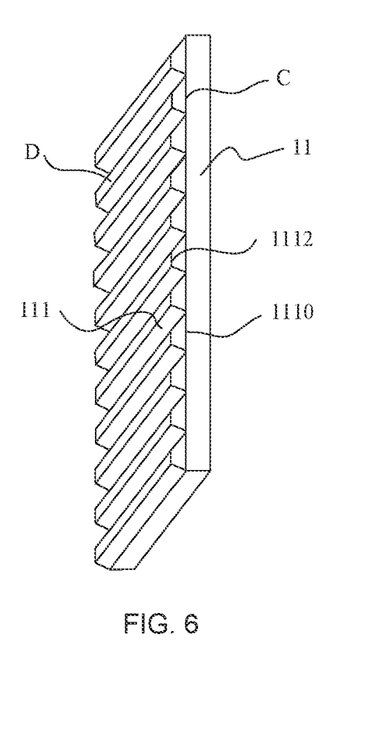
FIG. 6 is a structural diagram of a surface layer and a plurality of light-transmitting protrusions in yet another projection screen, in accordance with some embodiments.

FIG. 6 is a structural diagram of a surface layer and a plurality of light-transmitting protrusions in another projection screen, in accordance with some embodiments. The main difference between FIG. 6 and FIG. 3 is in the shape of the light-transmitting protrusion 111. Referring to FIG. 6, an orthogonal projection on the reference plane is in a shape of a trapezoid. And two surfaces in which two sides parallel to each other in the trapezoid are defined as a first surface C and a second surface D, respectively. An area of the first surface C is greater than an area of the second surface D. The first surface C is closer to the Fresnel lens layer 13 than the second surface D, so that the light-transmitting protrusion 111 as a whole narrows in the direction away from the Fresnel lens layer 13, so as to form the gradually narrowing portion 1112.

Of course, the shape of the orthogonal projection on the reference plane of each light-transmitting protrusion 111 is not limited to the above three types, as long as the light-transmitting protrusion 111 as a whole narrows in the direction away from the Fresnel lens layer 13, and forms at least one of the gradually narrowing portion 1112 or the gradually expanding portion.

For example, FIG. 7 is a partial structural diagram of a surface layer and a plurality of light-transmitting protrusions in yet another projection screen, in accordance with some embodiments. The main difference between FIG. 7 and FIG. 3 is in the shape of the light-transmitting protrusion 111. Referring to FIG. 7, the orthogonal projection on the reference plane of each light-transmitting protrusion 111 in a direction away from the Fresnel lens layer 13 has a gradually narrowing section and a gradually expanding section, and the gradually narrowing section is connected to the gradually expanding section, so that the light-transmitting protrusion 111 as a whole narrows in the direction away from the Fresnel lens layer 13, so as to form the gradually narrowing portion 1112 and the gradually expanding portion 1111.

The above is mainly described by considering an example in which the light-transmitting protrusions 111 are linear strip-shaped protrusions parallel to each other. In some embodiments, the light-transmitting protrusions 111 may be non-linear structures. For example, the light-transmitting protrusions 111 may be a bent structure or a curved structure; the light-transmitting protrusions 111 may not be parallel to each other, and the present disclosure is not limited thereto.

The above is mainly described by considering an example in which the light-transmitting protrusions 111 have the same sectional shape and size along the length direction. In some embodiments, the light-transmitting protrusions 111 may not have the aforementioned regular structure, that is, the sectional shapes and sizes of the light-transmitting protrusions 111 may be different along the length direction of the light-transmitting protrusions 111, and the present disclosure is not limited thereto.

The above is mainly described by considering an example in which the ight-transmitting protrusions 111 are continuously arranged. In some embodiments, the light-transmitting protrusions 111 may also be arranged at intervals, and the present disclosure is not limited thereto.

In some embodiments, the Fresnel lens layer 13 may be made by curing UV glue. Due to the UV glue having elasticity, the Fresnel lens layer 13 may be rolled.

Referring to FIG. 2, a surface of the Fresnel lens layer 13 away from the substrate layer 12 has a plurality of reflective surfaces 131 arranged in the vertical direction, and each reflective surface 131 is a plane inclined from top to bottom along the front view direction, an included angle θ between each reflective surface 131 and the horizontal plane tends to increase from top to bottom, and the included angle θ is in a range of 5° to 85° inclusive. For example, the included angle θ may be 5°, 10°, 15°, 25°, 45°, 65°, or 85°.

In some embodiments, the manufacturing method of the Fresnel lens layer 13 includes: coating the UV glue on the surface of the substrate layer 12 away from the surface layer 11; then stamping with a mold; using a UV light source to cure the UV glue; and finally demoulding, so that the Fresnel lens layer 13 may be formed.

Of course, in some embodiments, the Fresnel lens layer 13 may also be made of thermosetting glue.

In some embodiments, the reflective layer 14 is a metal layer coated on the Fresnel lens layer 13, and a thickness of the reflective layer 14 is small so that the reflective layer 14 can be rolled. In a case where the Fresnel lens layer 13 may be rolled, the Fresnel lens layer 13 and the reflective layer 14 still have flexibility as a whole, and rolling may be achieved.

In some embodiments, the method for manufacturing the reflective layer 14 includes: coating a metal layer on each reflective surface 131 of the Fresnel lens layer 13, so as to obtain the reflective layer 14.

In some embodiments, the reflective material in reflective layer 14 includes but is not limited to one of aluminum, silver, or a combination containing silver and aluminum.

Considering an example in which aluminum is taken as the reflective material, in some embodiments, the manufacturing method of the reflective layer 14 includes: first dissolving aluminum particles in a silane coupling agent (used as a solvent) to form aluminum powder solution, and then spraying the aluminum powder solution on the reflective surface 131 of the Fresnel lens layer 13 to obtain the reflective layer 14. In some embodiments, a diameter of the aluminum particles is in a range of 5 µm to 20 µm inclusive. It will be noted that, when selecting aluminum particles, it is not necessary to limit the diameter of the aluminum particles to a certain value, but generally the diameter of the aluminum particles is any value within the range of 5 µm to 20 µm inclusive. Thus, the average diameter of the aluminum particles is small, the particles are uniform, and the directionality is not obvious, so that the reflective layer 14 has a dense reflective surface. When the incident light 21 is irradiated on the reflective layer 14, the reflection path of the incident light 21 mainly depends on the inclination angle (i.e., the included angle θ) of the reflection surface 131 of the Fresnel lens layer 13, which avoids the chaotic reflection path caused by the large diameter of the aluminum particles, so that the outgoing light 22 may be incident on the eyes of the audience 3 along the preset direction, the gain of the projection screen 1 is relatively high, and the energy consumption of the projection screen 1 is reduced. In addition, in a case where the reflective layer 14 covers the reflective surface 131 of the Fresnel lens layer 13, the smaller the diameter of the aluminum particles, the smaller the required thickness of the reflective layer 14, the smaller the required quantity of aluminum particles, and the lower the manufacturing cost of the reflective layer 14. Therefore, in a case where the diameter of the aluminum particles is in a range of 5 µm to 20 µm, the production cost of the reflective layer 14 may be saved.

In some embodiments, a scaly aluminum powder with an average diameter to thickness ratio of (40:1) to (100:1) may also be selected. The scaly aluminum powder has a large diameter to thickness ratio. When the scaly aluminum powder is sprayed on the reflective surface 131, the binding ability of the scaly aluminum powder and the reflective surface 131 is strong, and the reflective layer 14 is not easy to fall off.

Figure 8:
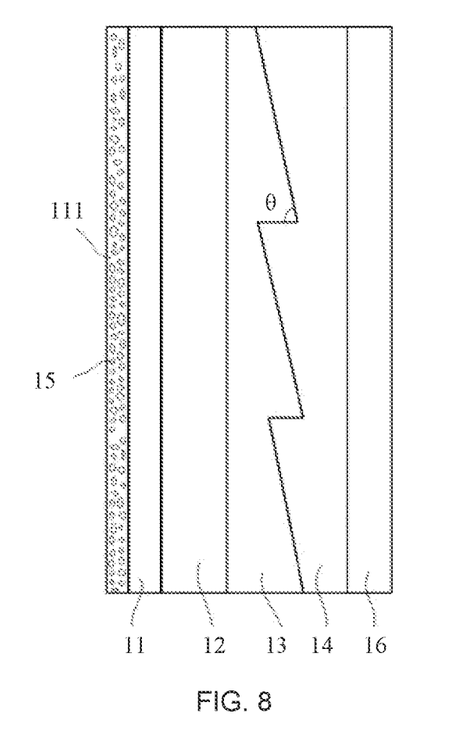
FIG. 8 is a structural diagram of another projection screen, in accordance with some embodiments.

FIG. 8 is a structural diagram of another projection screen, in accordance with some embodiments. Referring to FIG. 8, in some embodiments, the projection screen 1 further includes a protective layer 16, and the protective layer 16 is disposed on the surface of the reflective layer 14 away from the Fresnel lens layer 13. The protective layer 16 may protect the reflective layer 14, so as to prevent the reflective material in the reflective layer 14 from falling off.

The material of the protective layer 16 may be UV glue or paint. The protective layer 16 may be formed by coating UV glue or paint on the surface of the reflective layer 14 away from the Fresnel lens layer 13.

The substrate layer 12 is not only the supporting base of the entire projection screen 1, but also serves as a base for making the surface layer 11 and the Fresnel lens layer 13. In some embodiments, the substrate layer 12 is made of a flexible material, so that the surface layer 11, the substrate layer 12, the Fresnel lens layer 13, and the reflective layer 14 may be rolled. As a result, the projection screen 1 may be rolled, so as to facilitate transportation, installation, and use of the projection screen 1. For example, the material of the substrate layer 12 may be polyurethane (PU). PU is flexible and may be rolled arbitrarily without deformation. PU also has the advantages of wear resistance, high temperature resistance, high toughness, oil resistance, and strong mechanical properties. Therefore, it is possible to make the substrate layer 12 flexible by using PU, and then may achieve rolling the projection screen 1.

For another example, the material of the substrate layer 12 may be any one of thermoplastic polyurethane (TPU) elastomer rubber, polyethylene terephthalate (PET) plastic, or styrenic block copolymer (SBC). These flexible materials may make the substrate layer 12 flexible and rollable, and as a result the projection screen 1 may be rolled.

In some embodiments, in a case where the light-transmitting protrusion 111 is in a shape of a semi-cylindrical structure, an orthogonal projection of the light-transmitting protrusion 111 on the reference plane is in a shape of a semicircle, and the diameter of the semicircle is any value within a range of 20 µm to 300 µm inclusive. Therefore, in the case where the projection screen 1 may be rolled, it is also possible to avoid the reduction of the rolling performance of the surface layer 11 caused by the excessive sectional size of the light-transmitting protrusions 111.

Figure 9:
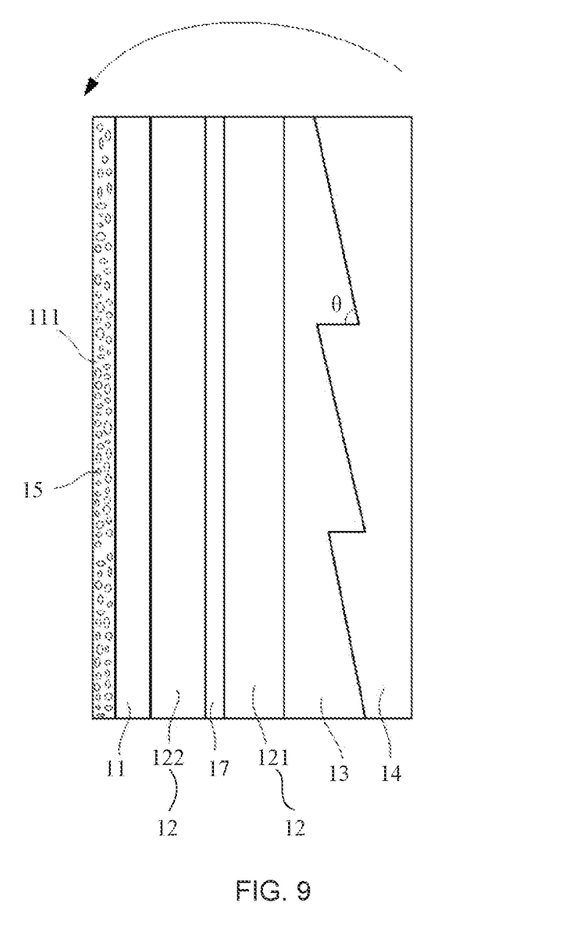
FIG. 9 is a structural diagram of yet another projection screen, in accordance with some embodiments.

FIG. 9 is a structural diagram of yet another projection screen, in accordance with some embodiments. Referring to FIG. 9, in some embodiments, the projection screen 1 includes a plurality of substrate layers 12. The plurality of substrate layers 12 are stacked in sequence. In a rolling direction of the projection screen 1, a thickness of the inner substrate layer 12 is smaller than a thickness of the outer substrate layer 12. Therefore, in the case where the projection screen 1 may be rolled, the risk of damage to the substrate layer 12 during the rolling process may also be reduced.

For example, referring to FIG. 9, the projection screen 1 includes two substrate layers 12, that is, a first substrate layer 121 and a second substrate layer 122. The first substrate layer 121 is closer to the Fresnel lens layer 13 than the second substrate layer 122. It will be noted that, the above-mentioned projection screen 1 may be rolled in a counterclockwise direction as shown by the solid arrow in FIG. 9, or in a clockwise direction.

In a case where the projection screen 1 is rolled in the counterclockwise direction shown by the solid arrow in FIG. 9, the second substrate layer 122 is located inside the first substrate layer 121. In this case, it is required that the thickness of the first substrate layer 121 is greater than the thickness of the second substrate layer 122.

In a case where the projection screen 1 is rolled in a clockwise direction opposite to the counterclockwise direction shown by the solid arrow in FIG. 9, the first substrate layer 121 is located inside the second substrate layer 122. In this case, the thickness of the first substrate layer 121 is less than the thickness of the second substrate layer 122.

Referring to FIG. 9, in a case where the projection screen 1 includes the plurality of substrate layers 12, the projection screen 1 further includes an adhesive layer 17, and two adjacent substrate layers 12 are bonded to each other through the adhesive layer 17. The adhesive layer 17 may use optically clear adhesive (OCA) glue, UV glue, or other glue, as long as the glue may bond two adjacent substrate layers 12 to each other.

The above are mainly described by considering an example in which the projection screen 1 includes two substrate layers 12. In some embodiments, the projection screen 1 may also include three, four, or more substrate layers 12. The present disclosure is not limited thereto.

It can be understood that, by making the projection screen 1 include a plurality of substrate layers 12, the rollable projection screen 1 has high flatness when unfolded. The more a number of the substrate layers 12 is, the greater the thickness of each substrate layer 12 is, and the better the flatness of the projection screen 1 in the unfolded state is.

Since a rolling degree of the inner substrate layer 12 is greater than a rolling degree of the outer substrate layer 12 in the rolling direction of the projection screen 1, the inner substrate layer 12 is more likely to be damaged. In some embodiments of the present disclosure, the thickness of the inner substrate layer 12 is less than the thickness of the outer substrate layer 12. Therefore, although the curling degree of the inner substrate layer 12 is large, the degree of extrusion deformation at the curling position will be eased due to the small thickness of the inner substrate layer 12, thereby reducing the risk of damage to the inner substrate layer 12 to a certain extent, and making it easier for the entire projection screen 1 to be rolled, and not easy to rebound after being rolled up.

In some embodiments, the thickness difference between two adjacent substrate layers 12 of the plurality of substrate layers 12 is any value within a range of 30 μm to 50 μm inclusive. For example, the thickness difference between two adjacent substrate layers 12 of the plurality of substrate layers 12 may be 30 μm, 40 μm, or 50 μm. Therefore, the projection screen 1 is easy to be rolled, and it is also conducive to preventing damage to the inner substrate layer 12 in the rolling direction.

Of course, in some embodiments, the thickness difference between two adjacent substrate layers 12 of the plurality of substrate layers 12 may also be any value outside the range of 30 μm to 50 μm. For example, the thickness difference between two adjacent substrate layers 12 of the plurality of substrate layers 12 may be 25 μm or 55 μm, and the present disclosure is not limited thereto.

In some embodiments, the thickness of each substrate layer 12 may be any value within a ramie of 75 μm to 300 μm inclusive. For example, the thickness of each substrate layer 12 may be 75 μm, 100 μm, 150 μm, 200 μm, 250 μm, or 300 μm. Thus, not only the normal rolling of the projection screen 1 may be achieved, but also the flatness of the projection screen 1 in the unfolded state may be ensured.

Of course, in some embodiments, the thickness of each substrate layer 12 may also be set outside the abovementioned range of 75 μm to 300 μm, for example, the thickness of each substrate layer 12 may be 50 μm or 350 μm.

It will be noted that the present disclosure is not limited to the substrate layer 12 made of flexible materials. In some embodiments, the substrate layer 12 may also be made of methyl methacrylate-styrene copolymer (MS), polyvinyl chloride (PVC), polyethylene (PE), polypropylene (PP), or other rigid materials.

Figure 10:
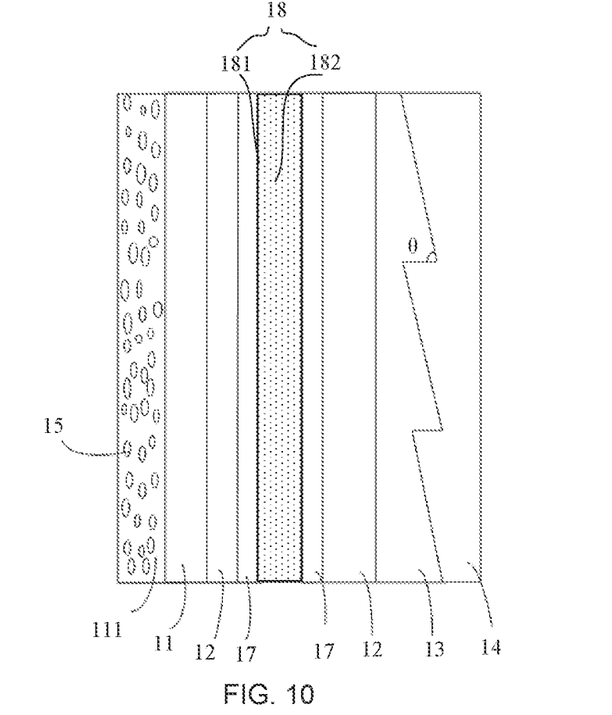
FIG. 10 is a structural diagram of yet another projection screen, in accordance with some embodiments.

FIG. 10 is a structural diagram of yet another projection screen, in accordance with some embodiments. Referring to FIG. 10, in a case where the projection screen 1 includes a plurality of substrate layers 12, the projection screen 1 further includes a colored layer 18 disposed between two adjacent substrate layers 12. The colored layer 18 includes a base layer 181 and a dark dye 182 disposed in the base layer 181.

The dark dye 182 is generally organic dye, such as azo dyes or phthalocyanine dyes.

In the case where the projection screen 1 may be rolled, in some embodiments, the base layer 181 is made of a flexible material, so that the colored layer 18 as a whole is flexible, so as to achieve rolling without affecting the rolling performance of the projection screen 1.

For example, the material of the base layer may be PET, PU, TPU, or SBC. In this case, the colored layer 18 and two adjacent base layers 12 may be bonded and connected through an adhesive layer 17. For example, the projection screen 1 in FIG. 10 includes two base material layers 12, and each base material layer 12 and the colored layer 18 are bonded and fixed through the corresponding adhesive layer 17.

Of course, the material of the base layer 181 may also be UV glue, OCA glue, or thermosetting glue. In this case, the colored layer 18 may be directly formed on a substrate layer 12, and then may be bonded with another substrate layer 12 in the process of curing through adhesion property of the colored layer 18. Thus there is no need for adhesive layer 17 to be bonded to substrate layer 12.

Of course, the base layer 181 may also be made of rigid materials such as MS, PVC, PP, or PE, regardless of whether the projection screen 1 may be rolled.

In some embodiments, the projection screen 1 may not include the colored layer 18, in this case, the contrast of the projection screen 1 may be improved through other manners.

For example, a dark dye may be provided in at least one of the surface layer 11, the substrate layer 12, the Fresnel lens layer 13, or the reflective layer 14, thereby improving the contrast of the projection screen 1 as well.

It will be noted that, in order to prevent the projection screen 1 from having low brightness during use, the dark dye may be provided in one of the surface layer 11, the substrate layer 12, the Fresnel lens layer 13, or the reflective layer 14.

For example, in a case where the dark dye is arranged in the reflective layer 14, on the basis of improving the contrast of the projection screen 1, the incident light is mainly reflected at the reflective layer 14 while being partly absorbed by the dark dye, while the energy loss in other layers of the projection screen 1 is small, so that the comprehensive energy loss is small, and the brightness of the projection screen 1 is relatively high during use.

It will be noted that, generally, in a case where the reflective layer 14 is made, a polymerization inhibitor or a dispersant is added to prevent aluminum particles from agglomerating. The dark dye can weaken the effect of the polymerization inhibitor or the dispersant, promote the agglomeration of the aluminum particles, thereby reducing the flatness of the reflective layer 14 to a certain extent. Thus, the incident light can be scattered to a certain extent when irradiated on the reflective layer 14. Further, the degree of diffusion of the incident light is large, and the viewing angle of the projection screen 1 can be improved. The Fresnel lens layer 13 may be made of UV glue, which is a high molecular polymer. Dark dyes are organic dyes that can be dissolved in polymers and organic solvents. Therefore, the binding force between the dark color dyes and the Fresnel lens layer 13 is relatively strong, and the adhesion of the reflective layer 14 as a whole on the Fresnel lens layer 13 is relatively high.

In some embodiments, a second diffusion particle may also be provided in at least one of the substrate layer 12 or the Fresnel lens layer 13, and the material of the second diffusion particle may be selected from PMMA, thereby further enlarging the viewing angle of projection screen 1.

For example, in the case where the projection screen 1 includes the plurality of substrate layers 12, and the second diffusing particles may be provided in at least one substrate layer 12 of the plurality of substrate layers 12.

It will be noted that, the second diffusion particle may be the same as or different from the first diffusion particle.

A person skilled in the art will understand that the scope of disclosure in the present disclosure is not limited to specific embodiments discussed above and may modify and substitute some elements of the embodiments without departing from the spirits of this application. The scope of the disclosure is limited by the appended claims.

What is claimed is:

1. A projection screen, comprising:
   a surface layer;
   at least one substrate layer;
   a Fresnel lens layer;
   a reflective layer; the surface layer, the at least one substrate layer, the Fresnel lens layer, and the reflective layer being sequentially arranged in a stack manner; and
   a plurality of light-transmitting protrusions, the plurality of light-transmitting protrusions being disposed on a surface of the surface layer away from the Fresnel lens layer; wherein at least one light-transmitting protrusion of the plurality of light-transmitting protrusions includes:
      a body portion; and
      at least one of a gradually narrowing portion or a gradually expanding portion, the gradually narrowing portion or the gradually expanding portion being disposed on a surface of the body portion away from the Fresnel lens layer;
   wherein the at least one substrate layer includes a plurality of substrate layers;
   the surface layer, the plurality of substrate layers, the Fresnel lens layer, and the reflective layer are sequentially stacked; the plurality of substrate layers are sequentially stacked; and
   in a rolling direction of the projection screen, a thickness of an inner substrate layer is smaller than a thickness of an outer substrate layer.

2. The projection screen according to claim 1, wherein the at least one light-transmitting protrusion is in a shape of a strip, and a length direction of the at least one light-transmitting protrusion is parallel to the Fresnel lens layer.

3. The projection screen according to claim 2, wherein the at least one light-transmitting protrusion has a linear shape, and the plurality of light-transmitting protrusions are arranged in parallel.

4. The projection screen according to claim 2, wherein in the length direction of the at least one light-transmitting protrusion, a shape and a size of a section of the at least one light-transmitting protrusion are same.

5. The projection screen according to claim 4, wherein the at least one light-transmitting protrusion is in a shape of a semi-cylindrical structure, and a diameter of a section of the semi-cylindrical structure is any value within a range of 20 μm to 300 μm inclusive.

6. The projection screen according to claim 5, wherein a plane perpendicular to the length direction of the light-transmitting protrusion is used as a reference plane, an orthogonal projection of the light-transmitting protrusion on the reference plane is in a shape of a semicircle, and a profile of semicircular section of the light-transmitting protrusion narrows down in a direction away from the Fresnel lens layer, so as to form the gradually narrowing portion.

7. The projection screen according to claim 6, wherein an area of the orthogonal projection of the light-transmitting protrusion on the reference plane is smaller than or equal to an area of a corresponding semi-circle; and
   the corresponding semi-circle refers to a semi-circle with a same curvature as the light-transmitting protrusion.

8. The projection screen according to claim 4, wherein the length directions of the plurality of light-transmitting protrusions are along a vertical direction, and the plurality of light-transmitting protrusions are arranged in parallel and continuously along a horizontal direction, so that any adjacent two light-transmitting protrusions of the plurality of light-transmitting protrusions are sequentially connected.

9. The projection screen according to claim 4, wherein a plane perpendicular to the length direction of the light-transmitting protrusion is used as a reference plane, an orthogonal projection of the light-transmitting protrusion on the reference plane is in a shape of a triangle, and the corresponding light-transmitting protrusion is a triangular prism structure; and
   a surface of the light-transmitting protrusion is facing the Fresnel lens layer, and an edge opposite to the surface is away from the Fresnel lens layer, so that the light-transmitting protrusion as a whole narrows in a direction away from the Fresnel lens layer, so as to form the gradually narrowing portion.

10. The projection screen according to claim 4, wherein a plane perpendicular to the length direction of the light-transmitting protrusion is used as a reference plane, an orthogonal projection of the light-transmitting protrusion on the reference plane is in a shape of a trapezoid, two surfaces in which two sides parallel to each other in the trapezoid are defined as a first surface and a second surface, respectively, and an area of the first surface is greater than an area of the second surface, the first surface is closer to the Fresnel lens layer than the second surface, so that the light-transmitting protrusion as a whole narrows in a direction away from the Fresnel lens layer, so as to form the gradually narrowing portion.

11. The projection screen according to claim 4, wherein a plane perpendicular to the length direction of the light-transmitting protrusion is used as a reference plane, an orthogonal projection of the light-transmitting protrusion on the reference plane in a direction away from the Fresnel lens layer has a gradually narrowing section and a gradually expanding section, and the gradually narrowing section is connected to the gradually expanding section, so that the light-transmitting protrusion as a whole narrows in a direction away from the Fresnel lens layer, so as to form the gradually narrowing portion and the gradually expanding portion.

12. The projection screen according to claim 1, wherein the plurality of light-transmitting protrusions satisfy one of the following:
   the plurality of light-transmitting protrusions each are a columnar structure, and a length direction of the columnar structure is perpendicular to an extending direction of an annular texture on a surface of the Fresnel lens layer, there is an arc surface at an end of the columnar structure away from the Fresnel lens layer, and the arc surface narrows or expands in a front view direction; and the plurality of light-transmitting protrusions include one of a bent structure and a curved structure, and the plurality of light-transmitting protrusions are not parallel to each other.

13. The projection screen according to claim 1, wherein the at least one light-transmitting protrusion satisfies at least one of the followings:
   a haze value of a surface of the at least one light-transmitting protrusion is any value within a range of 12% to 20% inclusive;
   or,
   the at least one light-transmitting protrusion further includes: first diffusion particles, and the first diffusion particles are arranged in the body portion.

14. The projection screen according to claim 1, wherein the surface layer, the at least one substrate layer, and the Fresnel lens layer are made of flexible materials, so as to make the projection screen rollable;
   wherein a material of the Fresnel lens layer and the surface layer is ultraviolet curing glue; a material of the at least one substrate layer is any one of polyurethane, thermoplastic polyurethane elastomer rubber, polyethylene terephthalate plastic, or styrenic block copolymer.

15. The projection screen according to claim 1, wherein a thickness difference between two adjacent substrate layers is any value within a range of 30 μm to 50 μm inclusive.

16. The projection screen according to claim 1, further comprising a colored layer, the colored layer being disposed between two adjacent substrate layers; and
   wherein the colored layer includes a base layer and a dark dye disposed in the base layer.

17. The projection screen according to claim 1, wherein a dark dye is provided in at least one of the surface layer, the at least one substrate layer, the Fresnel lens layer, and the reflective layer.

18. The projection screen according to claim 1, wherein second diffusion particles are provided in at least one of the at least one substrate layer or the Fresnel lens layer.

19. A projection system, comprising:
   a projector; and
   a projection screen, the projection screen being the projection screen according to claim 1.

* * * * *